(12) United States Patent
Corbin

(10) Patent No.: US 8,328,217 B2
(45) Date of Patent: Dec. 11, 2012

(54) MECHANICAL LINKAGES FOR CONTROLS ON BICYCLES

(76) Inventor: Graham Corbin, Cambridge (GB)

( * ) Notice: Subject to any disclaimer, the term of this patent is extended or adjusted under 35 U.S.C. 154(b) by 312 days.

(21) Appl. No.: 12/680,838

(22) PCT Filed: Sep. 17, 2008

(86) PCT No.: PCT/GB2008/050834
§ 371 (c)(1),
(2), (4) Date: Mar. 30, 2010

(87) PCT Pub. No.: WO2009/044183
PCT Pub. Date: Apr. 9, 2009

(65) Prior Publication Data
US 2010/0269619 A1    Oct. 28, 2010

(30) Foreign Application Priority Data
Oct. 1, 2007    (GB) .................................. 0719090.3

(51) Int. Cl.
*B62K 19/18*    (2006.01)

(52) U.S. Cl. ...................... 280/264; 280/279; 188/24.11; 188/2 D; 188/344; 74/502.3; 74/502.4; 74/502.5; 74/502.6

(58) Field of Classification Search ................... 280/264, 280/279; 188/24.11, 2 D, 344; 74/502.3–502.6
See application file for complete search history.

(56) References Cited

U.S. PATENT DOCUMENTS

| | | | | |
|---|---|---|---|---|
| 4,653,768 A | * | 3/1987 | Keys et al. ...................... | 280/279 |
| 4,753,448 A | * | 6/1988 | Nagashima ................... | 280/264 |
| 5,605,076 A | * | 2/1997 | Wu .............................. | 74/551.1 |
| 5,615,585 A | * | 4/1997 | Chi .............................. | 74/551.1 |
| 5,992,869 A | | 11/1999 | Yi-Chen | |
| 6,015,118 A | * | 1/2000 | Oda ............................... | 248/65 |
| 6,220,398 B1 | * | 4/2001 | Wu .......................... | 188/24.11 |
| 7,810,614 B1 | * | 10/2010 | Li .................................. | 188/2 D |
| 2004/0079186 A1 | * | 4/2004 | Nilsson ...................... | 74/502.6 |
| 2005/0115777 A1 | | 6/2005 | Goring | |

FOREIGN PATENT DOCUMENTS

| | | |
|---|---|---|
| DE | 20207344 U1 | 9/2002 |
| GB | 2351327 A | 12/2000 |

* cited by examiner

*Primary Examiner* — Tashiana Adams
*Assistant Examiner* — Marlon Arce
(74) *Attorney, Agent, or Firm* — David A. Guerra

(57) ABSTRACT

Conventional linkages between bicycle handlebar-mounted controls and rear brakes and gears are unable to accommodate unlimited rotation of the handlebars as is required on some so-called "freestyle" bicycles. A prior attempt to solve the problem employs a linkage comprising a bearing having two parts that are relatively rotatable about an axis. However this proposal is unable to handle situations where there are two or more mechanisms to be controlled e.g. a rear brake and a gear. The problem is solved by using multiple bearings (15, 16, 17) that share a common axis (X-X) of rotation but are located at different radial positions with respect to the axis. This avoids interference between the different linkages and makes it possible to locate the linkages around a stem on which the front wheel fork of the bicycle is mounted. A possible suitable location may be within a head tube of the bicycle frame. The invention is not limited to use with bicycles and can be employed in robotic and other machines.

16 Claims, 5 Drawing Sheets

MECHANICAL LINKAGES FOR CONTROLS ON BICYCLES

CROSS-REFERENCE TO RELATED APPLICATIONS

This application is an U.S. national phase application under 35 U.S.C. §371 based upon co-pending International Application No. PCT/GB2008/050834 filed on Sep. 17, 2008. Additionally, this U.S. national phase application claims the benefit of priority of co-pending International Application No. PCT/GB2008/050834 filed on Sep. 17, 2008, and Great Britain Application No. 0719090.3 filed on Oct. 1, 2007. The entire disclosures of the prior applications are incorporated herein by reference. The international application was published on Apr. 9, 2009 under Publication No. WO 2009/044183.

BACKGROUND OF THE INVENTION

1. Field of the Invention

This invention relates to a mechanical linkage designed to act between a controlling mechanism fixed relative to one machine part (which may be the handlebars or equivalent of a bicycle) and a controlled mechanism fixed relative to another part of the same machine, which second part may be the frame of the bicycle. When the machine is a bicycle, the "controlling mechanism" usually includes some form of lever whilst the "controlled mechanism" is usually a brake or gear.

2. Description of the Prior Art

Because the front wheel of a bicycle needs to swivel relative to the frame, the linkage must accommodate this swiveling movement. Patent specification FR571408 describes one way in which this can be done for a single rear brake. Other known techniques use Bowden cables which will flex sufficiently to allow some rotation of the handlebars and associated parts; but are unable to accommodate unlimited rotation of the front wheel support as is required on some so-called "freestyle" bicycles. To meet this problem, there have been many proposals for rotating couplings between two parts of a Bowden cable such as described in patent specifications U.S. Pat. No. 5,992,869 and GB 2351327.

These known rotatable couplings are all unable to serve more than one mechanism to be controlled on the fixed part of the bicycle frame. This is a serious problem because a large proportion of bicycles have at least two such mechanisms e.g. a rear brake and a gear, or a rear brake and two gears.

SUMMARY OF THE INVENTION

According to the invention there is provided a control device for a machine having a first part and a second part mounted for swiveling movement about an axis relative to the first part, the control device comprising a mechanical linkage designed to act between a controlling mechanism fixed relative to a first part of the machine and a controlled mechanism fixed relative to the second part of the machine, the linkage comprising a bearing having two parts relatively rotatable about the axis and connected respectively to the controlling and controlled mechanisms characterised by a second linkage designed to act between a second controlling mechanism fixed relative to the first part of the machine and a second controlled mechanism fixed relative to the second part of the machine, the second linkage comprising a second bearing located radially outward of the first bearing and having two parts relatively rotatable about the axis and connected respectively to the second controlling and controlled mechanisms.

Because the bearings are located at different radial positions with respect to the axis the different linkages do not interfere with each other and can, if desired, be arranged one within another so that they do not occupy an excessive dimension in the axial direction. Where, as is preferred, the aforementioned machine is a bicycle and the first and second parts are fixed relative to the front wheel fork and the frame respectively, this makes it possible to locate the linkages around a stem on which the front wheel fork is mounted and within a head tube of the frame.

BRIEF DESCRIPTION OF THE DRAWINGS

One way in which the invention may be performed will now be described by way of example with reference to the accompanying drawings in which: —

DESCRIPTION OF THE PREFERRED EMBODIMENT

Figure 1:
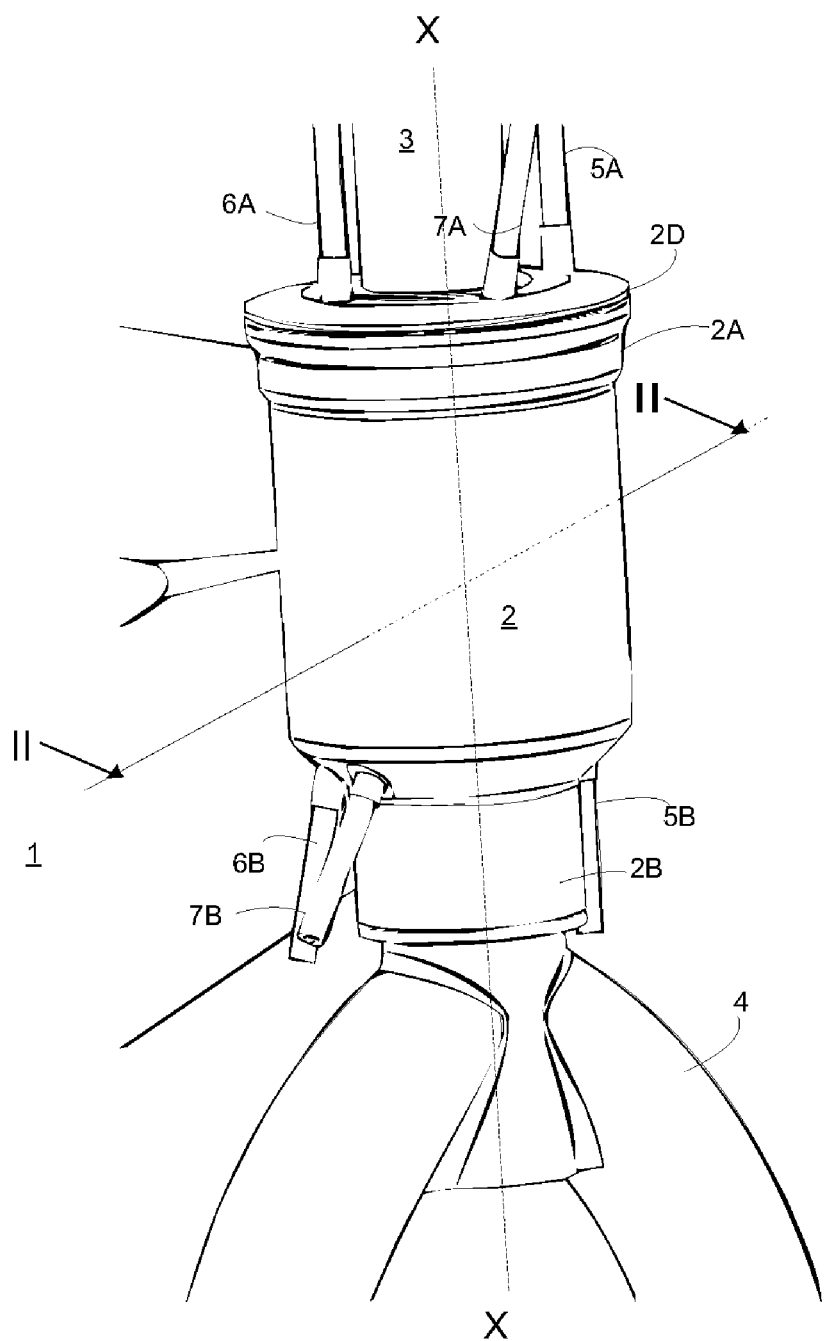
FIG. 1 is a perspective view of the head tube of a bicycle having a control device constructed in accordance with the invention, showing parts of the front wheel fork and stem.

Referring first to FIG. 1, the illustrated bicycle comprises a frame 1 including a head tube 2 carrying an upper main bearing assembly 2A and a lower main bearing assembly 2B. A steering stem 3 passes through the head tube and rotates in these main bearings about an axis X-X. The stem 3 carries a front wheel fork 4 and handlebars (not shown).

A rear brake linkage comprises a manual control (not shown) mounted on the handlebars and connected to an upper Bowden cable 7A. This is linked via a linkage bearing to be described later, to a lower Bowden cable 7B which leads to a rear brake mechanism of the bicycle.

A gear linkage comprises a manual control (not shown) also mounted on the handlebars and connected to an upper Bowden cable 6A. This is linked via a linkage bearing to be described later, to a lower Bowden cable 6B which leads to a gear mechanism.

A second gear linkage comprises a manual control (not shown) also mounted on the handlebars and connected to an upper Bowden cable 5A. This is linked via a linkage bearing to be described later, to a lower Bowden cable 5B which leads to a second gear mechanism.

Figure 2:
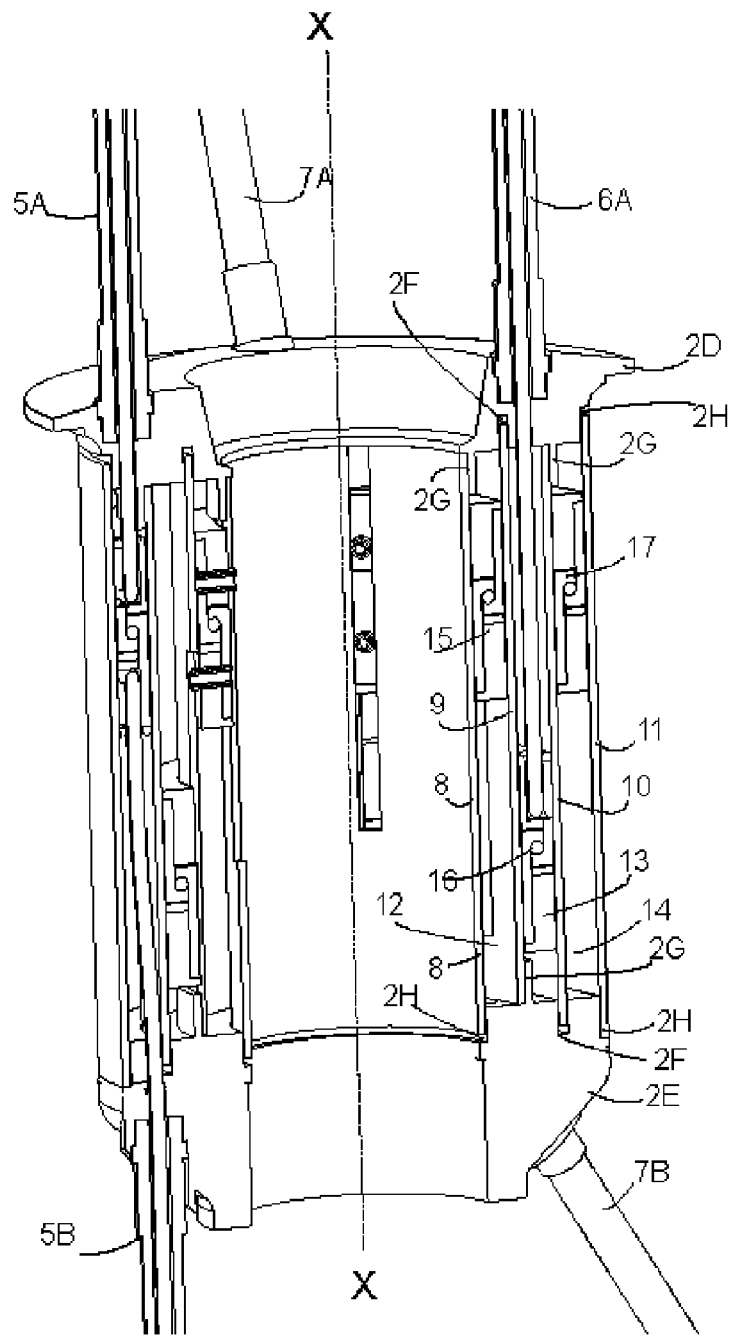
FIG. 2 is a perspective view of internal parts of the head tube of FIG. 1 shown partly as an cross-section down the axis X-X and through the line II-II of FIG. 1.
Figure 3:
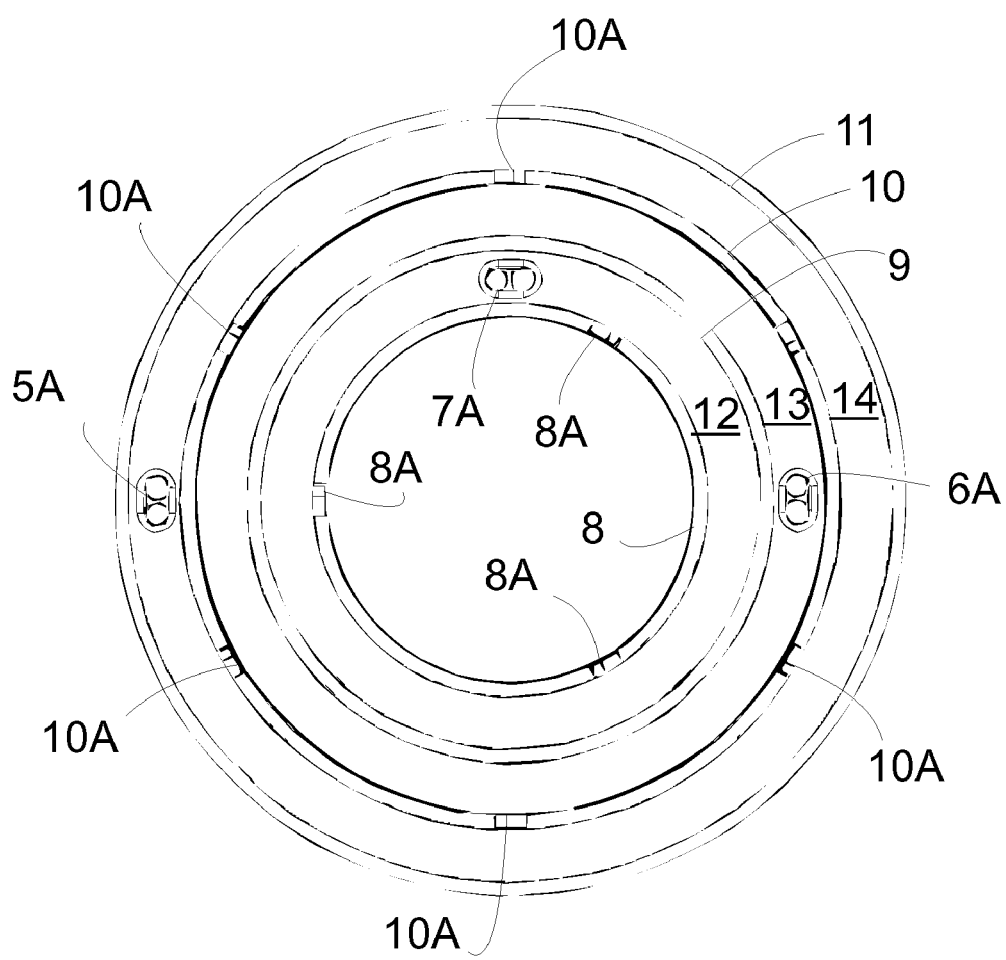
FIG. 3 is a plan view of the components shown in FIG. 2 with its top bearing support removed to reveal internal support cylinders, other internal components being not shown in this drawing.
Figure 4:
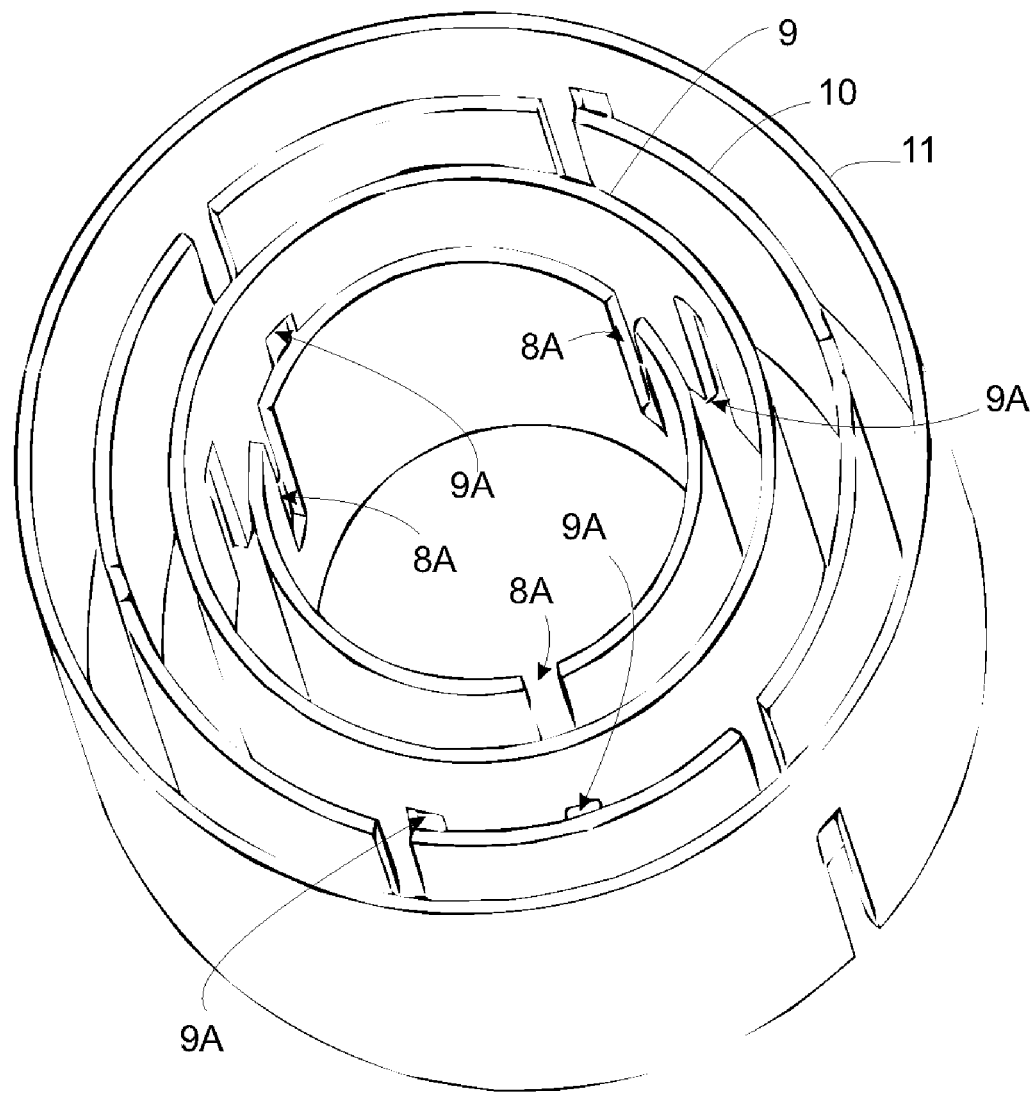
FIG. 4 is a perspective view of just the internal support cylinders of FIG. 3.

Referring now to FIGS. 2, 3 and 4, the upper main bearing 2A has a part 2D which receives the upper Bowden cables 5A, 6A and 7A and has a conical central opening by which it is clamped to the stem 3 (not shown in FIG. 2) by a compression fitting, also not shown. A lower conical casing 2E of the head tube receives the lower Bowden cables 5B, 6B, and 7B (6B not shown). The parts 2D and 2E are formed with circular grooves 2F, lips 2G and recesses 2H which serve to locate, co-axially with respect to the head tube, four cylindrical guides 8, 9 and 10 and 11 of progressively increasing diameter. The guides 8 and 10 are fixed relative to the part 2D and therefore rotate with the handlebars, whilst the guides 9 and 11 are fixed relative to the part 2E and therefore relative to the head tube and frame of the bicycle. The guide 11 fits snugly within the head tube 2, the latter being not shown in FIG. 2.

The cylindrical supports 8, 9, 10 and 11 define, between them, three vertical channels 12, 13 and 14 of annular cross-section in which are guided three axial annular ball bearings 15, 16 and 17. The bearings 15, 16 and 17 all have the same axial position when mid-way between their extremes of movement. FIG. 2 shows the bearing 16 lower than the others as a result of operation of one or more of the controls. These bearings are all designed to transmit mainly axial forces.

Figure 5:
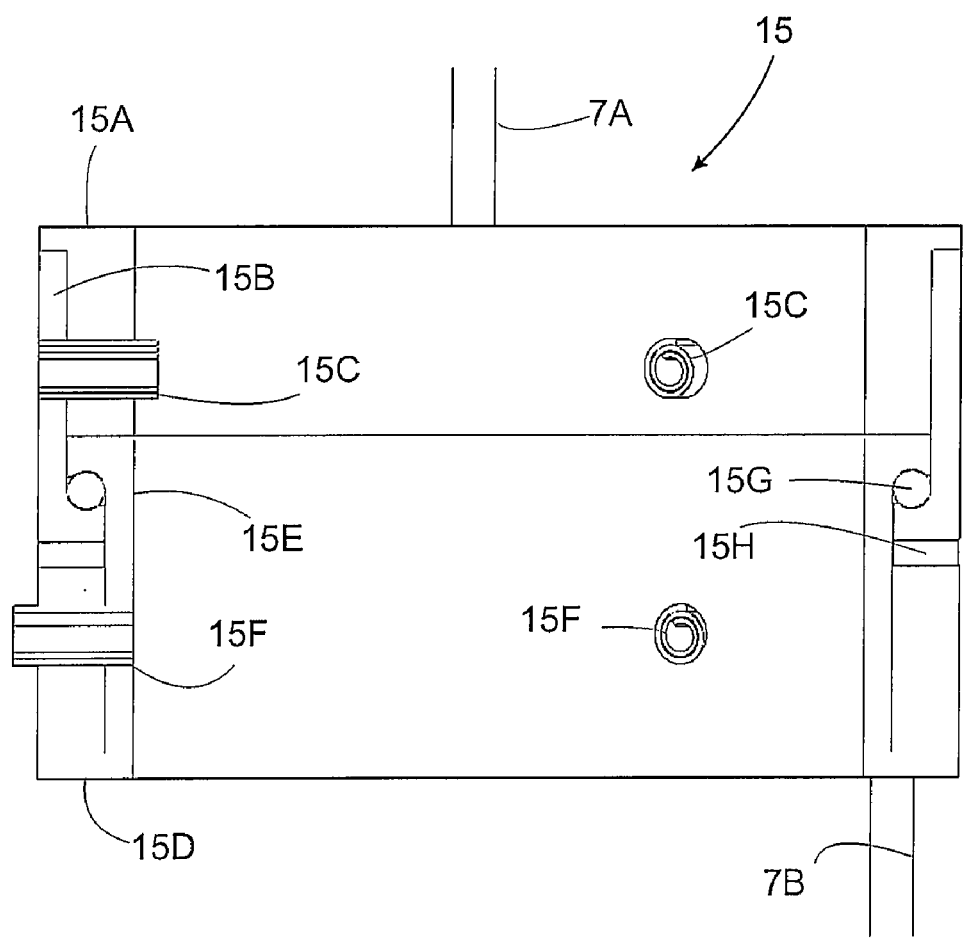
FIG. 5 is a detailed axial cross-section through one of the linkage bearings visible in less detail on FIG. 2.

FIG. 5 illustrates, by way of example, the bearing 15, the other bearings being similar except for their diameter. This bearing 15 has an upper ring 15A attached to the cable 7A and having its outer cylindrical surface formed with a recess into which fits a ball race 15B. The parts 15A and 15B have bores and are locked together by three roll pins 15C that pass through these bores to form a top part of the bearing. The bearing also has a lower ring 15D which is attached to cable 7B and has its inner surface formed with a recess into which fits a ball race 15E. The parts 15D and 15E are locked together by three roll pins 15F to form a bottom part of the bearing. Balls 15G are held between the races 15B and 15E and a washer 15H fits between the top and bottom parts 15B and 15D to transmit compression forces through the bearing.

The roll pins 15C project inwardly, from an inner surface of the ring 15A, into three respective slots 8A in the guide cylinder 8. Because the guide cylinder 8 is fixed in relation to the handlebars, this ensures that the top half of the bearing 15, comprising parts 15A and 15B, rotates with the handlebars and does not snag in the space 12.

The roll pins 15F project outwardly, from an outer surface of the ring 15D, into three respective slots 9A in the guide cylinder 9. Because the guide cylinder 9 is fixed in relation to the frame, this ensures that the bottom half of the bearing 15, comprising parts 15D and 15E does not rotate relative to the frame and does not snag in the space 12.

The construction of bearings 16 and 17 and the method by which they are guided in spaces 13 and 14 without snagging is similar to that of bearing 15. The only differences are the diameters of the bearings and the selection of which roll pins project inwardly and outwardly, this always being selected so that the lower bearing part (connected to the brake or gear to be controlled) has its pins projecting into the slots of a cylinder fixed relative to the frame whilst the upper bearing part (connected to the manually manipulatable control mechanism) has its pins projecting into the slots of a cylinder fixed relative to the steering stem. It will be noted that, whilst the inner and outer cylinders 8 and 11 require only three slots to receive pins of the lower and upper parts of bearings 15 and 17 respectively, the intermediate cylinder 9 requires six slots to guide the lower parts of bearings 15 and 16; and the intermediate cylinder 10 likewise requires six slots to guide the upper parts of bearings 16 and 17.

In operation, when tension is applied to the brake cable 7A the bearing part 15A is lifted, being guided by the walls of the channel 12 and by the action of the pins 15C within corresponding slots 8A which allows axial movement whilst constraining the part 15A to rotate with the handlebars even if any grit or other unwanted material or influences is/are present that would otherwise interfere with the frictionless rotation of the part 15. Expressed another way, rotation of the part 15A with respect to the handlebars is prevented by the slots 8A. Because of this action there is no flexing of the Bowden cable 7A during the rotation of the handlebars, which flexing might otherwise have the effect of applying forces liable to cause canting of the bearing 15 and consequential jamming or snagging of the bearing 15 in the channel 12. It also avoids inadvertent operation of the brake.

Upward movement of the bearing parts 15A and 15B cause the parts 15E and 15D also to rise within the channel 12, tensioning the Bowden cable 7B and thereby operating the rear brakes. The action of the pins 15F in the slots 9A prevents the part 15D from rotating relative to the frame even if any grit or other unwanted material or influences is/are present that would otherwise interfere with the frictionless rotation of the part 15D. Because of this action there is no flexing of the Bowden cable 7B during the rotation of the handlebars, which flexing might otherwise have the effect of applying forces liable to cause canting of the bearing and consequential jamming or snagging of the bearing in the channel 12. This action also prevents the risk that turning of the handlebars might inadvertently operate the brake.

Operation of both sets of gears follows the same principles as described for the rear brake system.

Because the bearings allow unlimited rotation it is possible to perform complete 360 degree turns of the handlebars. During this operation, the Bowden cables 5A, 6A and 7A remain entirely motionless relative to the handlebars whilst the cables 5B, 6B and 7B remain motionless relative to the frame, eliminating any possibility of entanglement or disadvantageous flexing of the cables. Because flexing of the cables does not occur it is possible in alternative constructions to employ non-flexible couplings that may include mechanical, electro-mechanical, hydraulic or pneumatic components, in place of the Bowden cables.

Although the invention has been particularly described in relation to a bicycle, the same principles can equally well be used in other machines, including robotic and agricultural machines where more than one mechanical control linkage is required to pass between two relatively rotating parts.

The invention claimed is:

1. A control device for a machine having a first part and a second part mounted for swiveling movement about an axis relative to the first part, said control device comprising:
    a first mechanical linkage acting between a first linkage controlling mechanism fixed relative to a first part of a machine and a first linkage controlled mechanism fixed relative to a second part of the machine, said first mechanical linkage comprising a first linkage bearing having at least two parts relatively rotatable about an axis and connected respectively to said first linkage controlling and first linkage controlled mechanisms; and
    a second mechanical linkage acting between a second linkage controlling mechanism fixed relative to said first part of said machine and a second linkage controlled mechanism fixed relative to said second part of said machine, said second mechanical linkage comprising a second linkage bearing located radially outward of said first linkage bearing and having at least two parts relatively rotatable about said axis and connected respectively to said second linkage controlling and controlled mechanisms;
    wherein said first linkage bearing and said second linkage bearing being arranged, one within another, so that said first linkage and second linkage bearings do not occupy an excessive dimension in an axial direction.

2. The control device according to claim 1 further comprising a third mechanical linkage acting between a third linkage controlling mechanism fixed relative to said first part and a third linkage controlled mechanism fixed relative to said second part, said third mechanical linkage comprising a third linkage bearing located radially outward of said first linkage bearing and having at least two parts relatively rotatable about said axis and connected respectively to said third linkage controlling and controlled mechanisms.

3. The control device according to claim 2, wherein that each of said first, second and third linkages acts between controlling and controlled mechanisms fixed to relatively rotatable parts of said machine.

4. The control device according to claim 3, wherein said machine is a bicycle, said first part comprising a front wheel support, and said second part comprising a frame of said bicycle.

5. The control device according to claim 4, wherein said first, second and third linkage bearings surround a stem that connects a front wheel fork to a handlebar.

6. The control device according to claim 5, wherein said first, second and third linkage bearings are enclosed within a head tube in which said stem is rotatably mounted.

7. The control device according to claim 5, wherein said first linkage controlled mechanism is selected from the group consisting of a rear brake, and gears.

8. The control device according to claim 5, wherein said second linkage controlled mechanism is selected from the group consisting of a rear brake, and gears.

9. The control device according to claim 5, wherein said third linkage controlled mechanism is selected from the group consisting of a rear brake, and gears.

10. A bicycle control device comprising:
    an upper bearing assembly attachable to at least three linkages, and a lower bearing assembly attachable to at least three linkages;
    at least four cylindrical guides of progressively increasing diameter, at least a first and second of said cylindrical guides being fixed relative to said upper bearing assembly, and at least a third and fourth of said cylindrical guides being fixed relative to said lower bearing assembly, said cylindrical guides defining therebetween each a channel, said channels each having an annular cross-section for guiding an axial annular bearing; and
    a bearing guidable by each of said channels defined by said cylindrical guides, said bearings each comprising:
    an upper ring having an outer surface formed with a recess fitted with an upper ring ball race;
    a lower ring having an inner surface formed with a recess fitted with a lower ring ball race;
    a plurality of balls held between said upper and lower ring ball races;
    at least one upper roll pin receivable in a bore defined through said upper ring and said upper ring ball race for locking said upper ring and said upper ring ball race together, said upper roll pin projecting from a surface of said upper ring into a respective slot in at least one of said first and second cylindrical guides; and
    at least one lower roll pin receivable in a bore defined through said lower ring and said lower ring ball race for locking said lower ring and said lower ring ball race together, said lower roll pin projecting from a surface of said lower ring into a respective slot in at least one of said third and fourth cylindrical guides;
    wherein said bearings each having a diameter different from the remaining said bearings.

11. The bicycle control device according to claim 10, wherein said upper bearing assembly defining a conical central opening clampable to a stem of a bicycle.

12. The bicycle control device according to claim 11, wherein said bearings are enclosed within a head tube in which said stem is rotatably mounted.

13. The bicycle control device according to claim 10 further comprising a washer fittable between said upper and lower ball races of each of said bearings to transmit compression forces through said bearing.

14. The bicycle control device according to claim 10, wherein said linkages attachable to said upper and lower bearing assemblies are selected from the group consisting of Bowden cables, mechanical, electro-mechanical, pneumatic, and hydraulics.

15. The bicycle control device according to claim 10, wherein said linkages attachable to said upper bearing assembly are linked to a mechanism selected from the group consisting of a rear brake, and gears.

16. The bicycle control device according to claim 10, wherein said linkages attachable to said lower bearing assembly are linked to a mechanism selected from the group consisting of a rear brake, and gears.

\* \* \* \* \*